United States Patent
Green et al.

(10) Patent No.: US 10,363,952 B2
(45) Date of Patent: Jul. 30, 2019

(54) ORDER FULFILLMENT CART HAVING NESTING CAPABILITY

(71) Applicant: Walmart Apollo, LLC, Bentonville, AR (US)

(72) Inventors: Jeffrey Green, Bentonville, AR (US); David Carr, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/684,483

(22) Filed: Aug. 23, 2017

(65) Prior Publication Data

US 2018/0057033 A1   Mar. 1, 2018

Related U.S. Application Data

(60) Provisional application No. 62/378,995, filed on Aug. 24, 2016.

(51) Int. Cl.
*B62B 3/14*     (2006.01)
*B62B 3/18*     (2006.01)
(Continued)

(52) U.S. Cl.
CPC .............. *B62B 3/1464* (2013.01); *B62B 3/10* (2013.01); *B62B 3/1412* (2013.01);
(Continued)

(58) Field of Classification Search
None
See application file for complete search history.

(56) References Cited

U.S. PATENT DOCUMENTS 3,527,359 A  *   9/1970   Ambertson ............ A47B 31/00
                                                    211/187
3,610,429 A  *  10/1971   MacKay ................ A47B 13/14
                                                    108/109
(Continued)

FOREIGN PATENT DOCUMENTS

DE       20201210154 U1    11/2012
JP         2004210018 A      7/2004

OTHER PUBLICATIONS

International Search Report & Written Opinion in International Patent Application No. PCT/US17/48211, dated Nov. 8, 2017; 12 pages.

(Continued)

*Primary Examiner* — Katy M Ebner
(74) *Attorney, Agent, or Firm* — Schmeiser, Olsen & Watts LLP

(57) ABSTRACT

An order fulfillment cart including a first frame portion, the first frame portion including a first plurality of support members, a second frame portion positioned a distance from the first frame portion, the second frame portion including a second plurality of support members, and a connector, the connector operably coupled to the first frame portion and the second frame portion, wherein the connector extends diagonally from the first frame portion to the second frame portion, wherein the first plurality of support members and the second plurality of support members are configured to support a plurality of containers between the first frame portion and the second frame portion, is provided. Furthermore, an associated method is also provided.

11 Claims, 7 Drawing Sheets

(51) Int. Cl.
*G06Q 10/08* (2012.01)
*G06Q 30/06* (2012.01)
*B62B 3/10* (2006.01)

(52) U.S. Cl.
CPC ............ *B62B 3/1428* (2013.01); *B62B 3/188* (2013.01); *G06Q 10/087* (2013.01); *G06Q 30/0633* (2013.01); *B62B 2202/12* (2013.01)

(56) References Cited

U.S. PATENT DOCUMENTS

| | | | | |
|---|---|---|---|---|
| 3,698,782 | A * | 10/1972 | Onori | A47B 31/00 312/350 |
| 3,887,253 | A * | 6/1975 | Bridges | A47B 31/00 312/236 |
| 4,575,164 | A * | 3/1986 | Pinnow | A47B 57/404 108/109 |
| 4,848,608 | A * | 7/1989 | Anderson | A47B 57/10 211/71.01 |
| 5,125,520 | A * | 6/1992 | Kawasaki | A47B 31/04 108/91 |
| 5,259,668 | A * | 11/1993 | Teufel | B62B 3/006 312/249.11 |
| 5,330,064 | A * | 7/1994 | Hall | A47F 5/135 16/29 |
| 5,957,309 | A * | 9/1999 | Hall | B62B 3/188 211/126.2 |
| 6,419,098 | B1 * | 7/2002 | Hall | A47B 47/021 211/126.2 |
| 7,419,063 | B1 * | 9/2008 | Hall | A21B 1/44 211/126.1 |
| 9,622,574 | B2 * | 4/2017 | Kabacinski | A47B 47/0083 |
| 2002/0175134 | A1 | 11/2002 | Hall | |
| 2003/0173320 | A1 * | 9/2003 | Linney, II | B62B 3/006 211/126.2 |
| 2003/0196975 | A1 * | 10/2003 | Murray | A21B 1/50 211/126.2 |
| 2004/0089625 | A1 * | 5/2004 | Tsai | A47F 5/108 211/126.2 |
| 2011/0089651 | A1 * | 4/2011 | De Bessa Camargo E Andrade | B62B 3/1464 280/33.992 |
| 2013/0211977 | A1 | 8/2013 | Lyon et al. | |
| 2015/0246751 | A1 * | 9/2015 | Spivack | B65D 31/12 224/411 |
| 2015/0282492 | A1 * | 10/2015 | Warren | A47F 10/06 99/443 R |

OTHER PUBLICATIONS

International Preliminary Report on Patentability for application No. PCT/US2017/048211 dated Mar. 7, 2019.

\* cited by examiner

ORDER FULFILLMENT CART HAVING NESTING CAPABILITY

RELATED APPLICATIONS

This application claims the benefit of U.S. Provisional Patent No. 62/378,995, filed Aug. 24, 2016, entitled "Order Fulfillment Cart Having Nesting Capability," the contents of which are incorporated by reference herein in their entirety.

FIELD OF TECHNOLOGY

The following relates to an order fulfillment cart, more specifically a cart used for fulfilling orders on a salesfloor, having a nesting capability to minimize a footprint when stored and not in use.

BACKGROUND

Grocery stores, supermarkets, and other retailers currently accept online orders to save customers time at the store filling a cart with desired items. For example, a customer can place an order online for a number of grocery items, and then either come to the store to pick-up the fulfilled order, or have the fulfilled order delivered to an address. Instead of the customer, store representatives fulfill the orders placed online by the customers, and ready the orders for customer pick-up or delivery. To fulfill the orders, store representatives typically use a single, generic picking cart to fulfill a limited number of orders, which can be time consuming and inefficient. Alternatively, store representatives use multiple generic picking carts to fulfill a larger number of orders, but multiple carts take up valuable space on a salesfloor, leading to crowded aisles. Further, when the picking carts are not being used, they take up additional floorspace when being stored.

Thus, a need exists for an order fulfillment cart for efficiently processing multiple customer online orders, with an ability to minimize space when stored, and method of use thereof.

SUMMARY

A first aspect relates generally to an order fulfillment cart comprising a first frame portion, the first frame portion including a first plurality of support members, a second frame portion positioned a distance from the first frame portion, the second frame portion including a second plurality of support members, a connector, and the connector operably coupled to the first frame portion and the second frame portion, wherein the connector extends diagonally from the first frame portion to the second frame portion, wherein the first plurality of support members and the second plurality of support members are configured to support a plurality of containers between the first frame portion and the second frame portion.

A second aspect relates generally to a cart comprising a first end frame, the first end frame including a first plurality of support members, a second end frame, the second end frame including a second plurality of support members, a middle frame, the middle frame having a third plurality of support members facing the first plurality of support members, and a fourth plurality of support members facing the second plurality of support members, a first receiving area configured to receive a plurality of containers disposed between the first end frame and the middle frame, a second receiving area configured to receive a second plurality of containers disposed between the middle frame and the second end frame, a connector, the connector operably coupled to the first end frame, the middle frame, and the second end frame, wherein the connector extends diagonally from the first end frame to the second end frame, forming a nesting area for an additional cart, wherein the connector of the cart abuts a connector of the additional cart in the nesting area when the cart and the additional cart are nested together in a nesting position.

A third aspect relates generally to a method of fulfilling an online customer order on a salesfloor, the method comprising providing a cart having a first end frame, the first end frame including a first plurality of support members, a second end frame, the second end frame including a second plurality of support members, a middle frame, the middle frame having a third plurality of support members facing the first plurality of support members, and a fourth plurality of support members facing the second plurality of support members, joining the first end frame and the second end frame by a connector, the connector extending diagonally from the first end frame to the second end frame to form a nesting area for an additional cart to nest with the cart, disposing a first plurality of containers between the first end frame and the middle frame, and disposing a second plurality of containers between the middle frame and the second end frame wherein merchandise to fulfill the online customer order is received by at least one container of the first plurality of containers or the second plurality of containers.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
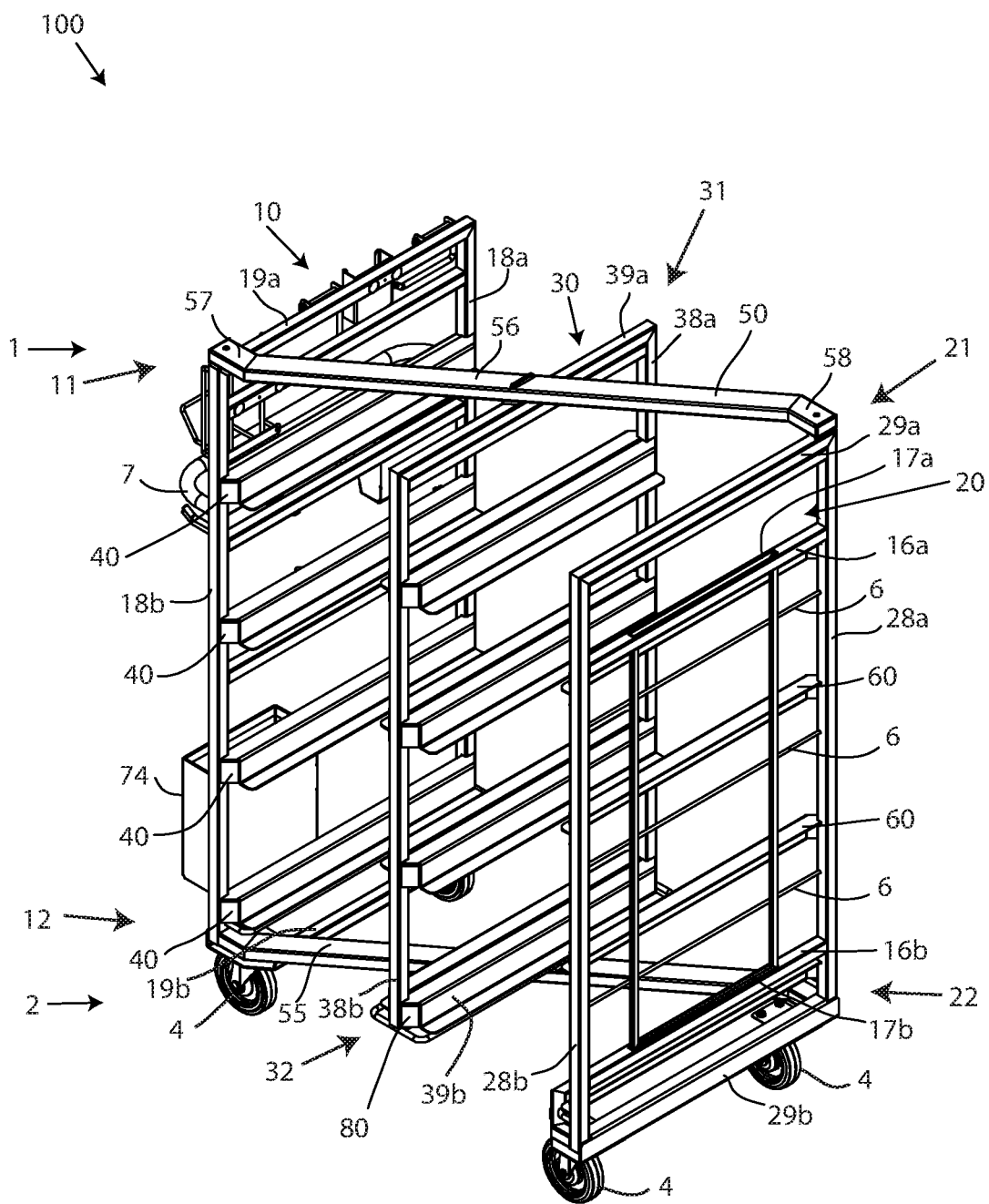
FIG. 1 depicts a perspective view of an embodiment of a cart for fulfilling orders, in accordance with the present invention.
Figure 2:
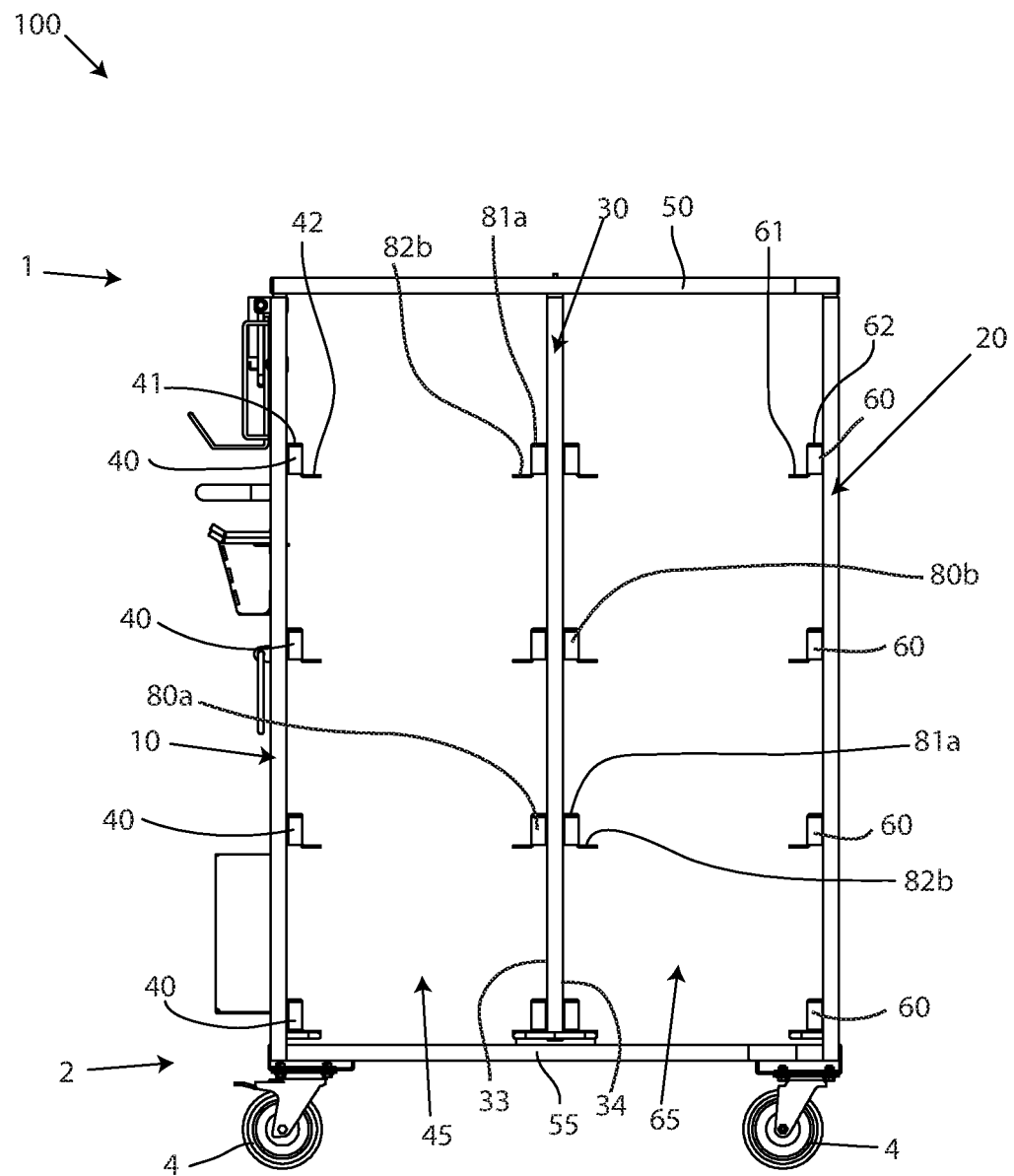
FIG. 2 depicts a side view of an embodiment of the cart for fulfilling orders of FIG. 1, in accordance with the present invention.
Figure 3:
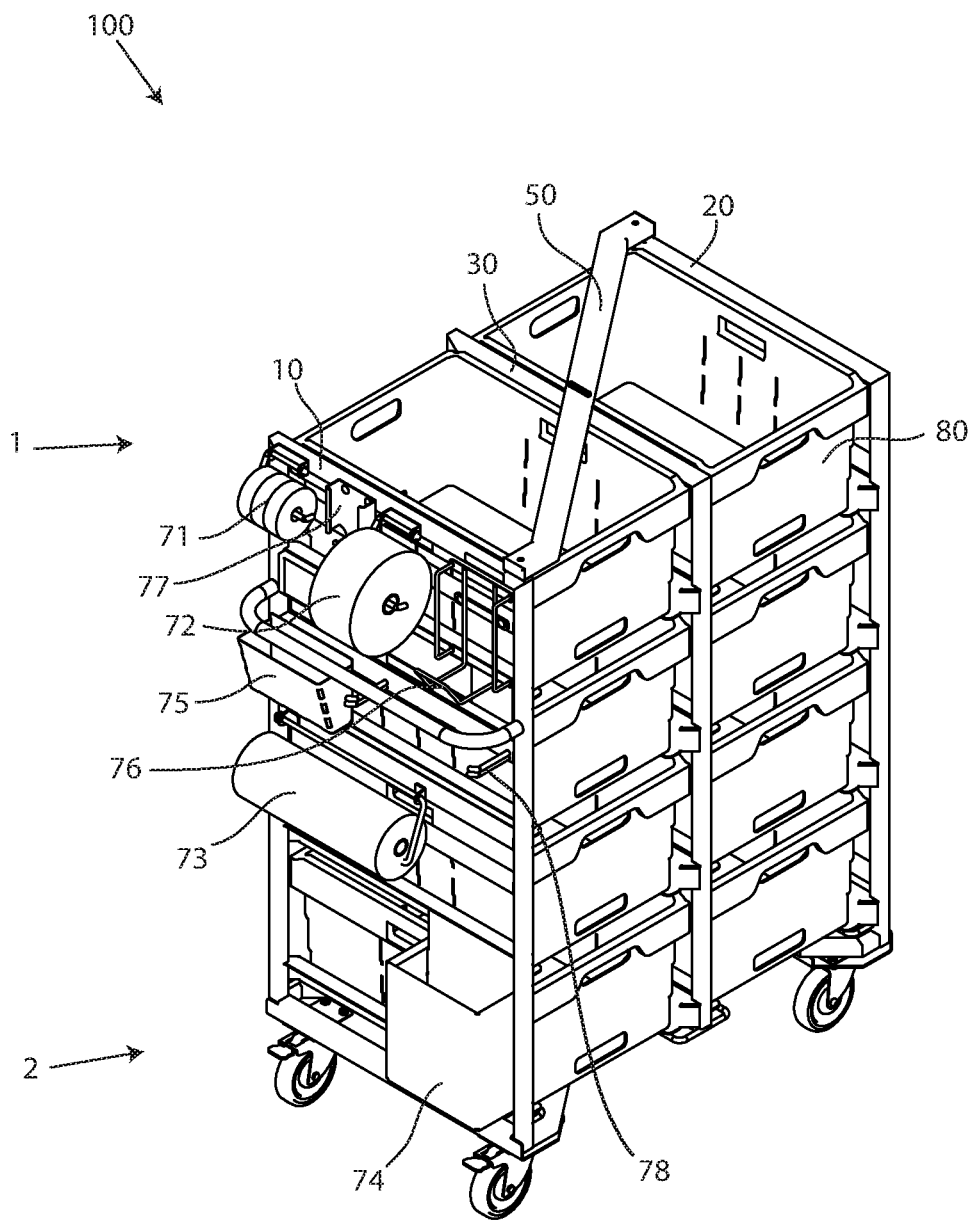
FIG. 3 depicts a perspective view of an embodiment of the cart for fulfilling orders shown in FIG. 1, with a plurality of containers, in accordance with the present invention.

Referring to the drawings, FIGS. 1-3 depict an embodiment of an order fulfillment cart 100. Embodiments of the order fulfillment cart 100 may be a cart, a picking cart, a pick cart, a portable cart, a portable device, a wheeled cart, a portable order processing device, an online order management cart, an organization cart, a sorting cart, a wagon, a carriage, a pushcart, and the like. Embodiments of the order fulfillment cart 100 may be used to process, manage, fulfill, etc. one or more online orders for one or more store items. For instance, an order placed online or otherwise remotely from the salesfloor for store items may be processed, managed, fulfilled, etc., by a store representative or other user using the order fulfillment cart 100. Embodiments of the order fulfillment cart 100 may be used to organize, store, collect, pick, gather, and/or receive items from a salesfloor. Items may be store inventory, products, store products, merchandise, goods, items, food, produce, bagged produce, fruits, vegetables, meat, grocery items, condiments, houseware items, dairy, hardware, general merchandise, and the like. In an exemplary embodiment, the order fulfillment cart 100 may be used by a personal shopper, store representative, or other user, to efficiently navigate a salesfloor or particular aisle when picking items located on the salesfloor to fulfill one or more customer orders. Moreover, embodiments of the cart 100 may be operated by an individual via a handle 7, wherein the cart 100 may be transportable via a plurality of wheels 4. Each wheel 4 may be independently lockable for full control of the movement of the cart 100.

In addition, embodiments of the cart 100 may also minimize a footprint or space taken up on the salesfloor when the cart 100 is not in use. For instance, embodiments of the order fulfillment cart 100 may include a nesting feature that can facilitate convenient storage of a plurality of cart 100 when not being used on the salefloor.

Embodiments of the order fulfillment cart 100 may include a first end 1 and a second 2, and a first frame portion 10 having a first plurality of support members 40, a second frame portion 20 having a second plurality of support members 60, a third frame portion 30 having a plurality of support members 80a, 80b, and a connector 50. The cart 100 may further include, operably coupled thereto, a label roll holder 71, a produce bag holder 72, a meat bag holder 73, a paper bag holder 74, a miscellaneous item bin 75, a printer holder 76, a mobile computer unit holder 77, and a plastic bag holder 78. In an exemplary embodiment, the inventory processing cart 100 may include a first frame portion 10, the first frame portion 10 including a first plurality of support members 40, a second frame portion 20 positioned a distance from the first frame portion 10, the second frame portion 20 including a second plurality of support members 60 and a connector 50, the connector 50 operably coupled to the first frame portion 10 and the second frame portion 20, wherein the connector 50 extends diagonally from the first frame portion 10 to the second frame portion 20, wherein the first plurality of support members 40 and the second plurality of support members 60 are configured to support a plurality of containers 80 between the first frame portion 10 and the second frame portion 20.

Referring still to FIGS. 1-3, embodiments of the order fulfillment cart 100 may include a first frame portion 10. Embodiments of the first frame portion 10 may be a frame, a frame component, an end portion, a first end, a first end portion, a side wall, a wall, an end wall, a frame member, and the like. Embodiments of the first frame portion 10 may have a first end 11 and a second end 12. Further, embodiments of the first frame portion 10 may include a top frame member 19a, a bottom frame member 19b, and two side frame members 18a, 18b, wherein the two side frame members 18a, 18b operably connect to both the top frame member 19a and the bottom frame member 19b. The top frame member 19a and the bottom frame member 19b may be parallel to each other, and perpendicular to the side frame members 18a, 18b to form a rectangular-shaped first frame portion 10. The frame members 19a, 19b, 18a, 18b may be fastened to each other using a plurality of fasteners, may be structurally integral, or may be welded to each other to form the first frame portion 10. One or more cross-members 6 may be disposed between the two side members 18a, 18b for added structural support and/or for providing an attachment means or surface for one or more peripherals, signage, accessories, bins, and the like, described in greater detail infra. Gaps may exist between the cross-members 6. The cross-members 6 may also be operably coupled to the side members 18a, 18b by a plurality of fasteners, welding techniques, or may be structurally integral with the side members 18a, 18b. Moreover, embodiments of the first frame portion 10 may be comprised of plastic, metal, metal alloy, composites, or combinations thereof. A cross-section of the first frame portion 10, and components thereof, may be rectangular, square, circular, curvilinear, or otherwise polygonal. Embodiments of the first frame portion 10 may vary in height, but may have a height between 4 feet and 5 feet.

Furthermore, embodiments of the first frame portion 10 may include a plurality of support members 40. Embodiments of the support members 40 may be a railing, a rail, a shelf, a lip, a surface, a support, a ledge, and the like, wherein the member 40 can extend a continuous distance between the side members 18a, 18b, or may be comprised of multiple, smaller sections positioned on the first frame portion 10 along a same plane as each other to create a support surface within the cart 100. The plurality of support members 40 may be operably coupled to the first frame portion 10. For example, each support member 40 may be operably coupled to an interior side or surface of the first frame portion 10. The support members 40 may be attached or fastened to the first frame portion 10, or may be structurally integral with the first frame portion 10. Embodiments of the support members 40 may be configured to support, accommodate, receive, hold, suspend, and/or store at least one container 90, or a portion of a container 90. For instance, embodiments of support members 40 may support a container 90, or a portion thereof, slidably disposed between the first frame portion 10 and the second frame portion 10. In this embodiment, the support members 40 may support or otherwise engage a portion or a side of the container 90, wherein support members 60 of the second frame portion 20 support or otherwise engage a portion or other side of the container 90.

In an exemplary embodiment, the support members 40 may be configured to support a container 90, or a portion thereof, disposed between the first frame portion and a third frame portion 30, wherein the third frame portion 30 is positioned between the first frame portion 10 and the second frame portion 20. In this embodiment, the support members 40 may support or otherwise engage a portion or a side of the container 90, wherein support members 80a of the third frame portion 30 support or otherwise engage a portion or other side of the container 90. The area between the interior surface of the first frame portion 10 and a first side 33 of the third frame portion 30 may be referred to as a first receiving area 45. Embodiments of the receiving area 45 may be an area, a cavity, a receiving column, an interior region, a space, and the like, wherein one or more containers 90 may be slidably disposed or otherwise stowed between the first frame portion 10 and the third frame portion 30.

Moreover, embodiments of the support members 40 may be spaced apart along the interior surface of the first frame portion 10. A distance between each support member 40 may be sufficient accommodate a container 90, with at least a small tolerance to allow the containers 90 to be slidably disposed within and removed from the cart 100. For example, a distance between the support members 40 may be 10-12 inches. Those having ordinary skill in the art should appreciate that the distance between the support members 40 may vary depending on a size of the container 90, as well as the number of support member 40 depending on a number of containers 90 to be supported within the receiving area 45. Further, each support member 40 of the plurality of support member 40 may include a first surface 41 and a second surface 42. The first surface 41 may be vertically separated from the second surface 42 a small distance to accommodate containers of various heights. The first surface 41 may also protrude a smaller distance from the first frame portion 10 than the second surface 42 to accommodate containers of various widths. For example, a shallower, but wider container may be best supported by resting upon or otherwise engaging the first surface 41, whereas a deeper, but perhaps narrower container may be best supported by resting upon or otherwise engaging the second surface 42. Because the support member 40 may include a plurality of surfaces 41, 42, a retailer may have an option of utilizing two different sized containers that can fit within any cart 100 on a salesfloor, wherein each of the two containers may be utilized for a particular purpose.

With continued reference to FIGS. 1-3, embodiments of the order fulfillment cart 100 may include a second frame portion 20. Embodiments of the second frame portion 20 may share the same or substantially the same structure and function as the first frame portion 10. For instance, embodiments of the second frame portion 20 may be a frame, a frame component, an end portion, a first end, a first end portion, a side wall, a wall, an end wall, a frame member, and the like. Embodiments of the second frame portion 20 may have a first end 21 and a second end 22. Further, embodiments of the second frame portion 20 may include a top frame member 29a, a bottom frame member 29b, and two side frame members 28a, 28b, wherein the two side frame members 28a, 28b operably connect to both the top frame member 29a and the bottom frame member 29b. The top frame member 29a and the bottom frame member 29b may be parallel to each other, and perpendicular to the side frame members 28a, 28b to form a rectangular-shaped second frame portion 20. The frame members 29a, 29b, 28a, 28b may be fastened to each other using a plurality of fasteners, may be structurally integral, or may be welded to each other to form the second frame portion 20. One or more cross-members may be disposed between the two side members 28a, 28b for added structural support and/or for providing an attachment means or surface for one or more peripherals, signage, accessories, bins, and the like, described in greater detail infra. Gaps may exist between the cross-members. The cross-members may also be operably coupled to the side members 28a, 28b by a plurality of fasteners, welding techniques, or may be structurally integral with the side members 28a, 28b. Moreover, embodiments of the second frame portion 20 may be comprised of plastic, metal, metal alloy, composites, or combinations thereof. A cross-section of the second frame portion 20, and components thereof, may be rectangular, square, circular, curvilinear, or otherwise polygonal. Embodiments of the second frame portion 20 may vary in height, but may have a height between 4 feet and 5 feet.

Furthermore, embodiments of the second frame portion 20 may include a plurality of support members 60. Embodiments of the support members 60 may a railing, a rail, a shelf, a lip, a surface, a support, a ledge, and the like, wherein the member 60 can extend a continuous distance between the side members 28a, 28b, or may be comprised of multiple, smaller sections positioned on the second frame portion 20 along a same plane as each other to create a support surface within the cart 100. The plurality of support members 60 may be operably coupled to the second frame portion 20. For example, each support member 60 may be operably coupled to an interior side or surface of the second frame portion 20. The support members 60 may be attached or fastened to the second frame portion 20, or may be structurally integral with the second frame portion 20. Embodiments of the support members 60 may be configured to support, accommodate, receive, hold, suspend, and/or store at least one container 90, or a portion of a container 90. For instance, embodiments of support members 60 may support a container 90, or a portion thereof, slidably disposed between the first frame portion 10 and the second frame portion 10. In this embodiment, the support members 60 may support or otherwise engage a portion or a side of the container 90, wherein support members 40 of the first frame portion 10 support or otherwise engage a portion or other side of the container 90.

In an exemplary embodiment, the support members 60 may be configured to support a container 90, or a portion thereof, disposed between the second frame portion 20 and a third frame portion 30, wherein the third frame portion 30 is positioned between the first frame portion 10 and the second frame portion 20. In this embodiment, the support members 60 may support or otherwise engage a portion or a side of the container 90, wherein support members 80b of the third frame portion 30 support or otherwise engage a portion or other side of the container 90. The area between the interior surface of the first frame portion 10 and a second side 34 of the third frame portion 30 may be referred to as a second receiving area 65. Embodiments of the receiving area 65 may be an area, a cavity, a receiving column, an interior region, a space, and the like, wherein one or more containers 90 may be slidably disposed or otherwise stowed between the second frame portion 20 and the third frame portion 30.

Moreover, embodiments of the support members 60 may be spaced apart along the interior surface of the second frame portion 20. A distance between each support member 60 may be sufficient to accommodate a container 90, with at least a small tolerance to allow the containers 90 to be slidably disposed within and removed from the cart 100. For example, a distance between the support members 60 may be 10-12 inches. Those having ordinary skill in the art should appreciate that the distance between the support members 60 may vary depending on a size of the container 90, as well as the number of support member 60 depending on a number of containers 90 to be supported within the receiving area 65. Further, each support member 60 of the plurality of support members 60 may include a first surface 61 and a second surface 62. The first surface 61 may be vertically separated from the second surface 62 a small distance to accommodate containers of various heights. The first surface 61 may also protrude a smaller distance from the second frame portion 20 than the second surface 62 to accommodate containers of various widths. For example, a shallower, but wider container may be best supported by resting upon or otherwise engaging the first surface 61, whereas a deeper, but perhaps narrower container may be best supported by resting upon or otherwise engaging the second surface 62. Because the support member 60 may include a plurality of surfaces 61, 62, a retailer may have an option of utilizing two different sized containers that can fit within any cart 100 on a salesfloor, wherein each of the two containers may be utilized for a particular purpose.

Embodiments of the order fulfillment cart 100 may also include a third frame portion 30. The third frame portion 30 may be positioned between the first frame portion 10 and the second frame portion 20. In some embodiments, more than one frame portion may be positioned between the first frame portion 10 and the second frame portion 20 to define additional receiving areas for one or more containers. Embodiments of the third frame portion 30 may be a middle frame, a middle frame portion a middle portion, a frame, a frame component, a wall, an end wall, a frame member, and the like. Embodiments of the third frame portion 30 may have a first end 31 and a second end 32. Further, embodiments of the third frame portion 30 may include a top frame member 39a, a bottom frame member 39b, and two side frame members 38a, 38b, wherein the two side frame members 38a, 38b operably connect to both the top frame member 39a and the bottom frame member 13b. The top frame member 39a and the bottom frame member 39b may be parallel to each other, and perpendicular to the side frame members 38a, 38b to form a rectangular-shaped third frame portion 30. The frame members 39a, 39b, 38a, 38b may be fastened to each other using a plurality of fasteners, may be structurally integral, or may be welded to each other to form the third frame portion 30. One or more cross-members may be disposed between the two side members 38a, 38b for added structural support. Moreover, embodiments of the third frame portion 30 may be comprised of plastic, metal, metal alloy, composites, or combinations thereof. A cross-section of the third frame portion 30, and components thereof, may be rectangular, square, circular, curvilinear, or otherwise polygonal. Embodiments of the third frame portion 30 may vary in height, but may have a height between 4 feet and 5 feet.

Furthermore, embodiments of the third frame portion 30 may include a plurality of support members 80a coupled to a first side 33 of the third frame portion 30, a plurality of support members 80b coupled to a second side 34 of the third frame portion 30. Embodiments of the support members 80, 80b may a railing, a rail, a shelf, a lip, a surface, a support, a ledge, and the like, wherein the member 80a, 80b can extend a continuous distance between the side members 38a, 38b, or may be comprised of multiple, smaller sections positioned on the third frame portion 30 along a same plane as each other to create a support surface within the cart 100. For example, each support member 80a, 80b may be operably coupled to an interior side or surface of the first side 33 or second side 34, respectively, of the third frame portion 30. The support members 80a, 80b may be attached or fastened to the third frame portion 30, or may be structurally integral with the third frame portion 30. Embodiments of the support members 80a, 80b may be configured to support, accommodate, receive, hold, suspend, and/or store at least one container 90, or a portion of a container 90. For instance, embodiments of support members 80a may support a container 90, or a portion thereof, slidably disposed between the first frame portion 10 and the third frame portion 30 in the first receiving area 45. In this embodiment, the support members 80a may support or otherwise engage a portion or a side of the container 90, wherein support members 40 of the first frame portion 10 support or otherwise engage a portion or other side of the container 90.

In another exemplary embodiment, support members 80b may support a container 90, or a portion thereof, slidably disposed between the second frame portion 20 and the third frame portion 30 in the second receiving area 65. In this embodiment, the support members 80b may support or otherwise engage a portion or a side of the container 90, wherein support members 60 of the second frame portion 20 support or otherwise engage a portion or other side of the container 90.

Moreover, embodiments of the support members 80a, 80b may be spaced apart along the first side 33 and second side 34, respectively, of the third frame portion 30. A distance between each support member 80a, 80b may be sufficient accommodate a container 90, with at least a small tolerance to allow the containers 90 to be slidably disposed within and removed from the cart 100. For example, a distance between the support members 80a, 80b may be 10-12 inches. Those having ordinary skill in the art should appreciate that the distance between the support members 80a, 80b may vary depending on a size of the container 90, as well as the number of support members 80a, 80b depending on a number of containers 90 to be supported within the receiving areas 45, 65. Further, each support member 80a of the plurality of support members 80a may include a first surface 81a and a second surface 82a. Likewise, each support member 80b of the plurality of support members 80b may include a first surface 81b and a second surface 82b. The first surface 81a, 81b may be vertically separated from the second surface 82a, 82b a small distance to accommodate containers of various heights. The first surface 81a, 81b may also protrude a smaller distance from the third frame portion 30 than the second surface 82a, 82b to accommodate containers of various widths. For example, a shallower, but wider container may be best supported by resting upon or otherwise engaging the first surface 81a, 81b, whereas a deeper, but perhaps narrower container may be best supported by resting upon or otherwise engaging the second surface 82a, 82b.

FIG. 3 depicts an embodiment of the order processing cart 100, wherein a plurality of containers 90 are supported by the support members 40, 60, 80a, 80b. One or more containers 90 may be slidably disposed within receiving areas 45, 65 for convenient transport across a salesfloor. For example, embodiments of cart 100 can allow a store representative to transport or otherwise move many containers 90 from location to location on a salesfloor, while picking items from a display location on the salesfloor and placing the items within the containers 90. This can be helpful when fulfilling multiple online customer orders for goods or merchandise at a single time, with the ability to organize and store a large amount of items. Further, embodiments of the cart 100 may be accessible from both sides of the cart 100. The containers 90 may be slidably removed from either side of the cart 100, so a store representative can access or otherwise utilize the containers 90, no matter which side of the cart 100 the store representative is working on. This can also be helpful if an additional store representative is fulfilling orders, wherein the additional store representative can work on an opposing side of the cart 100.

Embodiments of the order fulfillment cart 100 may also include accessories, peripherals, holders, bins, and the like, to increase an efficiency of order fulfillment. Embodiments of the order fulfillment cart 100 may include a label roll holder 71, a produce bag holder 72, a meat bag holder 73, a paper bag holder 74, a miscellaneous item bin 75, a printer holder 76, a mobile computer unit holder 77, and a plastic bag holder 78. The label roll holder 71, produce bag holder 72, meat bag holder 73, paper bag holder 74, miscellaneous item bin 75, printer holder 76, mobile computer unit holder 77, and plastic bag holder 78 may be operably coupled to the cart 100. In one embodiment, the label roll holder 71, produce bag holder 72, meat bag holder 73, paper bag holder 74, miscellaneous item bin 75, printer holder 76, mobile computer unit holder 77, and plastic bag holder 78 may be operably coupled to the first frame portion 10, or may be operably coupled to the second frame portion 20. Each of the accessories, peripherals, holders, and bins may be mounted to the cart 100 for permanent attachment to the cart 100. Alternatively, these items may be removably attached to the cart 100, using various means, such as a latch, a hook system, a rail system, connectors, buttons, etc. Because the label roll holder 71, produce bag holder 72, meat bag holder 73, paper bag holder 74, miscellaneous item bin 75, printer holder 76, mobile computer unit holder 77, and plastic bag holder 78 may be operably coupled to the cart 100, a store representative gathering store items for placement in the cart may be less likely to need to retrieve a necessary object to properly store the item, account for the item, package the item, etc.

Figures 4A, 4B, 4C:
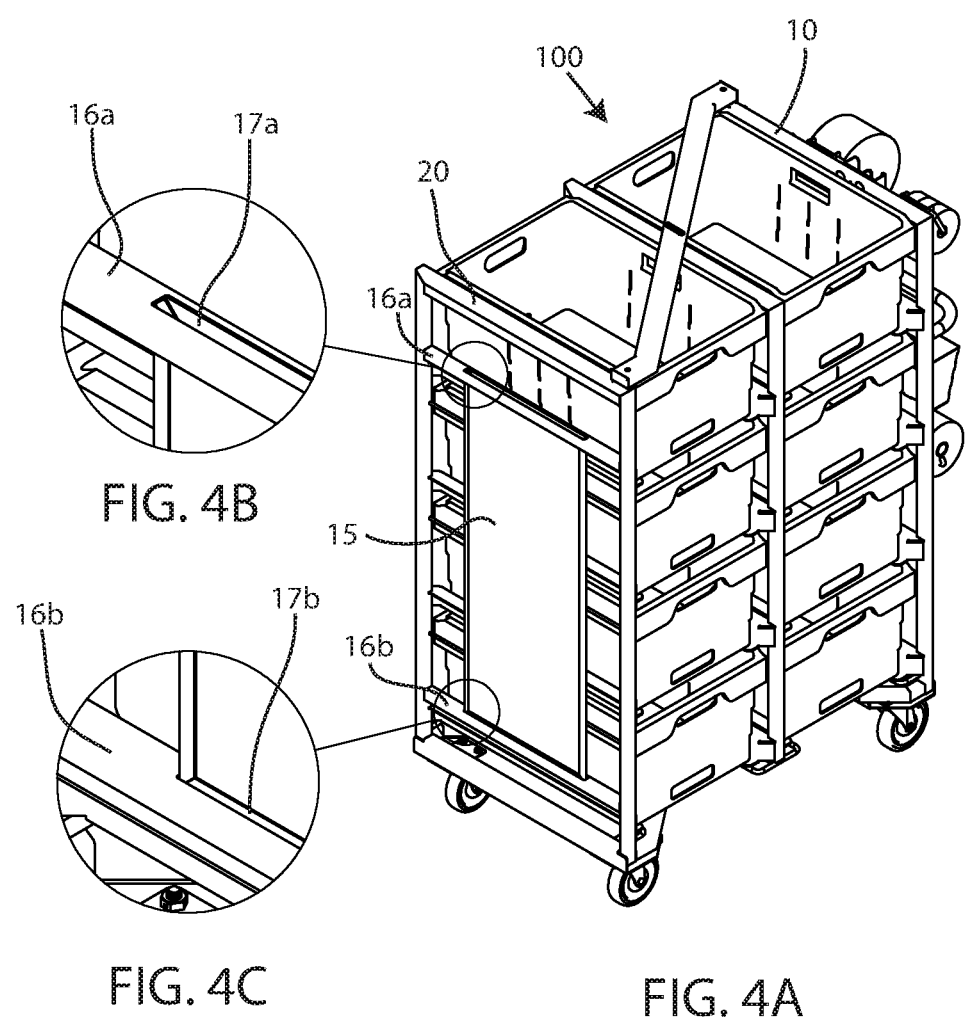
FIG. 4A depicts a perspective view of an embodiment of the cart of FIG. 1, including an embodiment of signage, in accordance with the present invention.
FIG. 4B depicts a first detailed view of FIG. 4A, in accordance with the present invention.
FIG. 4C depicts a second detailed view of FIG. 4A, in accordance with the present invention.

With reference to FIGS. 4A-4C, further embodiments of the order fulfillment cart 100 may include signage 15 operably attached to the cart 100. Embodiments of signage may be signs, posters, branding and/or promotional material, and the like, and may be removably coupled to one of the first frame portion 10 and the second frame portion 20. For example, signage 15 may be located on a side of the cart 10 opposite the accessories, bins, etc. The signage 15 may be supported or displayed between a first member 16a and a second member 16b. The first member 16a may have an opening 17a, such as a slot, aperture, gap, and the like, to receive the signage, wherein the second member 16a may include a corresponding opening 17b, such as a slot, cavity, receiving means, receptacle, and the like, to accept a bottom end of the signage 15, as shown in more detail in FIGS. 4B-4C. The signage 15 may be interchangeable, replaced with new signage to accommodate new promotions.

In further embodiments, the containers 90 may be suspended from the support members 40, 60, 80a, 80b, as opposed to resting thereupon. For example, a lip of the container 90 may extend beyond a side wall of the container, and the lip may engage the one of the surfaces of the support member 40, 60, 80a, 80b such that the container hangs from the support member 40, 60, 80a, 80b.

Figure 5A:
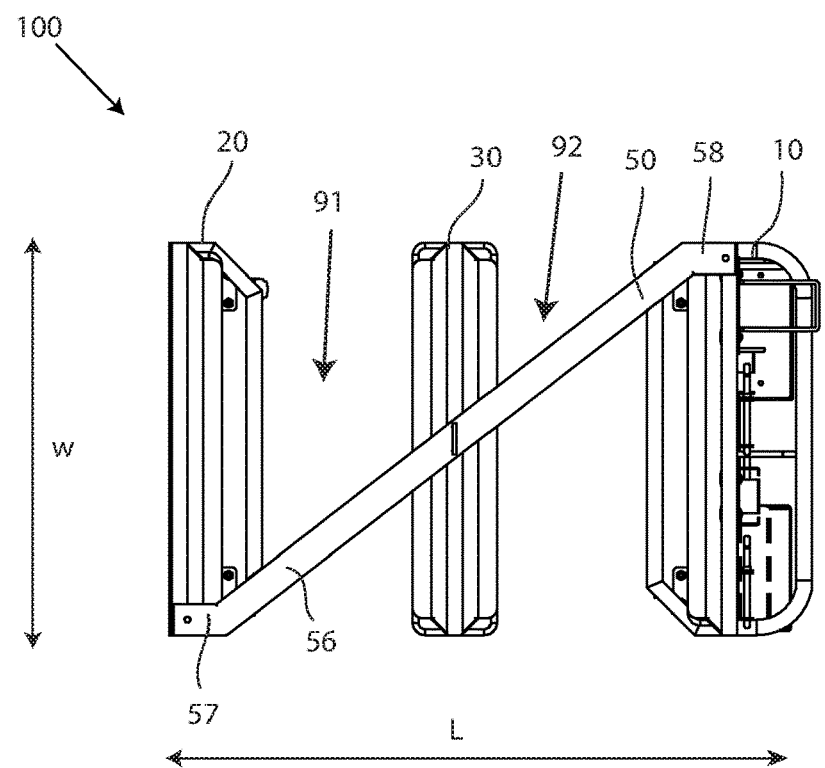
FIG. 5A depicts a top view of the cart of FIG. 1, in accordance with the present invention.
Figure 5B:
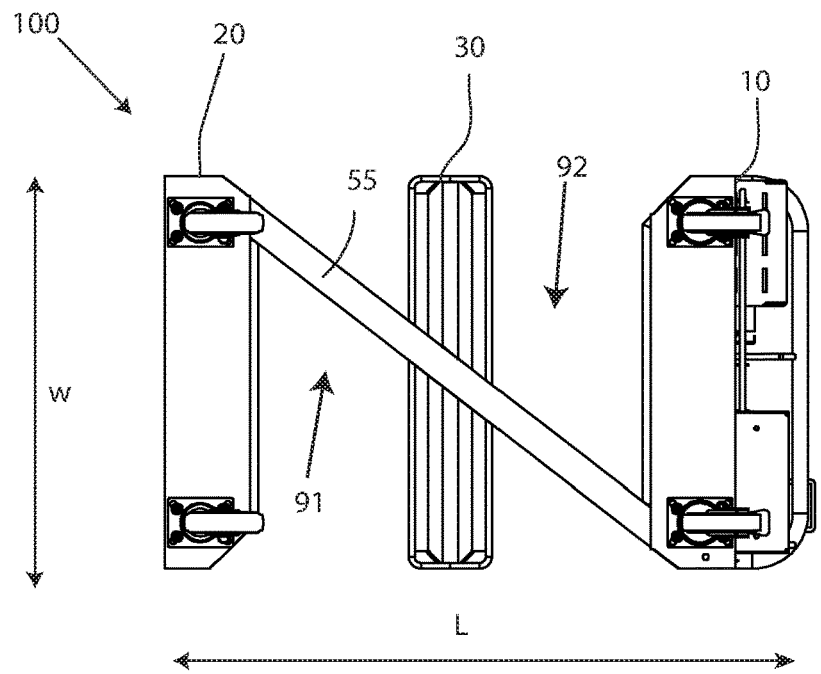
FIG. 5B depicts a bottom view of the cart of FIG. 1, in accordance with the present invention.

Continuing to refer to FIGS. 1-3, and now with additional reference to FIGS. 5A and 5B, embodiments of the cart 100 may include a connector 50. Embodiments of the connector 50 may be a connection member, a structure, a structural member, a joining member, a connecting member, and the like. The connector 50 may be operably coupled to the first frame portion 10 and the second frame portion 20. In some embodiments, the connector 50 may also be operably coupled to a third frame portion 30, or even additional frame portions of the cart 100. For instance, the connector 50 may be fixed or otherwise attached to the cart 100 at a location on the first frame portion 10, the second frame portion 20, and the third frame portion 30. In an exemplary embodiment, the connector 50 may be fixedly attached to the cart 100 such that the frame portions 10, 20, 30 are stationary with respect to the connector 50. Alternatively, the connector 50 may be pivotably attached to the frame portions 10, 20, 30 such that the cart 100 may fold or otherwise hinge or pivot for stacking or storing. Accordingly, embodiments of the connector 50 may join or otherwise connect the frame portions 10, 20, 30 together to form a single cart 100. Embodiments of the connector 50 may include a first portion 57, a second portion 56, and a third portion 58, wherein the first portion 57, second portion 56, and third portion 58 are structurally integral so as to form a single structural member. Embodiments of the first portion 57 may be operably connected to the first frame portion 10, for example, located atop the top frame member 19a at or proximate a corner of the top frame member 19a. Embodiments of the third portion 58 may be operably connected to the second frame portion 20, located atop the top frame member 29a at or proximate a corner of the top frame member 29a. Embodiments of the second portion 56 may extend between the first portion 57 and the third portion 58 on a diagonal, such that the connector spans or otherwise extends diagonally from the first frame portion 10 to the second frame portion 20. In other words, the connector 50 may span a length, L, of the cart 100, while also spanning a width, w, of the cart 100, from a corner location of the first frame portion 10 to a diagonally opposed corner location of the second frame portion 20. In some embodiments, an additional connector 55 may be located at the second end 2 of the cart 100, wherein the additional connector 55 may share the same or substantially the same structure and function as the connector 50. The additional connector 55 may provide added stability to the cart 100.

Figure 6:
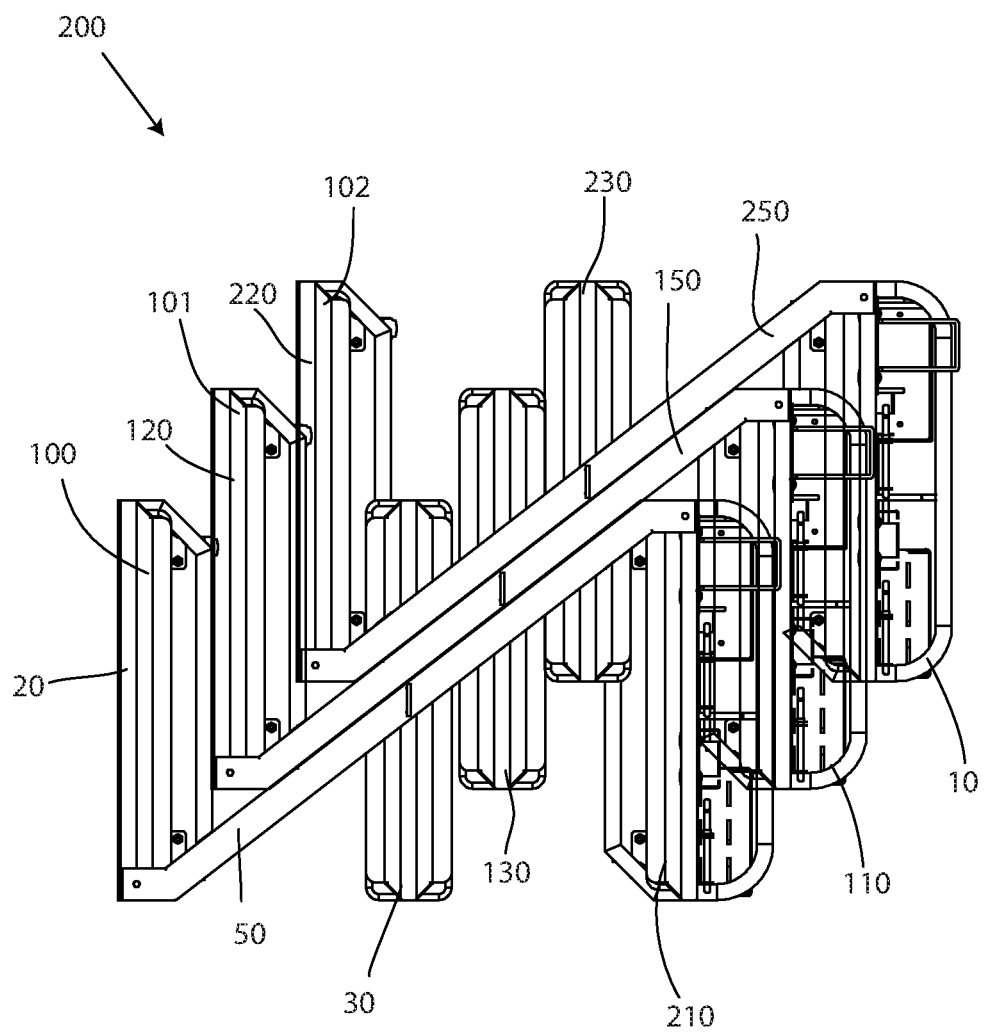
FIG. 6 depicts a top view of a group of carts nested together in a nesting position, in accordance with the present invention.

Because the connector 50 may span diagonally across a length, L, of the cart 100, and a distance above the top frame members 19a, 29a, 39a, of the frame portions 10, 20, 30, nesting areas 91, 92 may be formed. Nesting area 91 may be the area, space, void, gap, and the like between the first frame portion 10 and the third frame portion 30. Nesting area 92 may be the area, space, void, gap, and the like between the second frame portion 20 and the third frame portion 30. Nesting areas 91, 92, which may be located on either side of a middle frame portion, may be configured to receive one or more portions of an additional order fulfillment cart when in a stored, or nested, position. FIG. 6 depicts a group 200 of multiple order fulfillment carts 100, 101, 102, wherein carts 101 and 102 share the same structure and function of cart 100. A second frame portion 120, or at least a portion thereof, of an additional cart 101 and a second frame portion 220, or at least a portion thereof, of an additional cart 102 may be received within nesting area 91 of the cart 100. Similarly, a third frame portion 130, or at least a portion thereof, of the additional cart 101 and a third frame portion 230, or at least a portion thereof, of the additional cart 102 may be received within nesting area 92 of the cart 100. As a result, the connector 50 of the cart 100 abuts a connector of the additional cart 101 in the nesting areas 91, 92 such that a plurality of carts 100, 101, 102 nest together in a nesting position. The nesting positions of a plurality of carts 100 may minimize a footprint on a salesfloor when the carts 100 are not in use.

Figure 7:
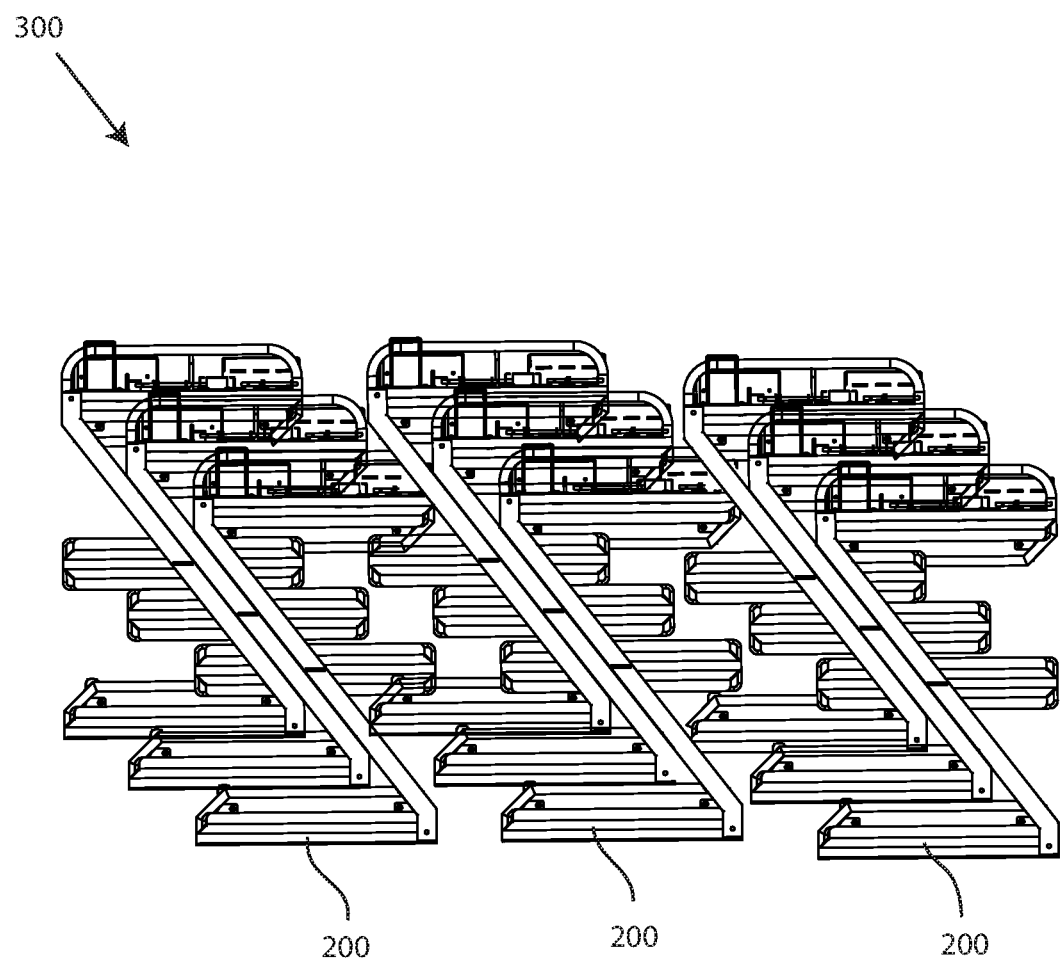
FIG. 7 depicts a top view of a nest including a plurality of groups of carts, in accordance with the present invention.

FIG. 7 depicts a nest 300 of a plurality of groups 200 of carts 100, 101, 102 in a nesting position of FIG. 6. The nest 300 may include a plurality of groups 200 oriented or otherwise positioned side-by-side to further reduce a footprint on a salesfloor when the carts 100 are stored or otherwise not used.

Referring to FIGS. 1-7, a method of fulfilling an online customer order on a salesfloor may include the step of providing a cart 100 having a first end frame 10, the first end frame 10 including a first plurality of support members 40, a second end frame 20, the second end frame 20 including a second plurality of support members 60, a middle frame 30, the middle frame 30 having a third plurality of support members 80a facing the first plurality of support members 40, and a fourth plurality of support members 80b facing the second plurality of support members 60. Embodiments of the method may also include joining the first end frame 10 and the second end frame 20 by a connector 50, the connector 50 extending diagonally from the first end frame 10 to the second end frame 20 to form a nesting area 91, 92 for an additional cart 101 to nest with the cart 100. Further, embodiments of the method may include disposing a first plurality of containers 80 between the first end frame 10 and the middle frame 30 and disposing a second plurality of containers 80 between the middle frame 30 and the second end frame 20. Merchandise to fulfill the online customer order may be received by at least one container 80 of the first plurality of containers or the second plurality of containers.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. An order fulfillment cart comprising:
   a first frame portion, the first frame portion including a first plurality of support members configured to support a first plurality of containers that are slidably removable from the order fulfillment cart;
   a second frame portion positioned a distance from the first frame portion, the second frame portion including a second plurality of support members configured to support a second plurality of containers that are slidably removable from the order fulfillment cart;
   a third frame portion positioned between the first frame portion and the second frame portion, wherein the third frame portion includes a third plurality of support members on a first side facing the first plurality of support members, configured to support the first plurality of containers that are slidably removable from the order fulfillment cart, and a fourth plurality of support members on an opposing second side facing the second plurality of support members, configured to support the second plurality of containers that are slidably removable from the order fulfillment cart; and
   a connector having a first end that is attached to the first frame portion on a top surface of the first frame portion so that the first end of the connector overlaps a portion of a top frame member of the first frame portion, and a second end that is attached to the second frame portion on a top surface of the second frame portion so that the second end of the connector overlaps a portion of a top frame member of the second frame portion, such that the connector spans diagonally across a length of the order fulfillment cart above the top surfaces of the first frame portion and the second frame portion, wherein a first nesting area is formed between the first frame portion and the third frame portion and a second nesting area is formed between the second frame portion and the third frame portion;
   wherein, when the order fulfillment cart is in a nesting position with a neighboring order fulfillment cart, the connector abuts a connector of the neighboring order fulfillment cart and frame components of the neighboring order fulfillment cart pass under the connector and reside within the first nesting area and the second nesting area.

2. The order fulfillment cart of claim 1, wherein each support member of the first plurality of support members includes a first surface and a second surface, the first surface being raised from the second surface and protruding a lesser distance from the first frame portion.

3. The order fulfillment cart of claim 1, wherein the plurality of containers are slidably removable from both sides of the order fulfillment cart.

4. The order fulfillment cart of claim 1, wherein the containers are configured to receive store product from a salesfloor to fulfill a customer order placed online.

5. The order fulfillment cart of claim 1, further comprising:
   a produce bag holder;
   a meat bag holder;
   a paper bag holder;
   one or more bins;
   a mobile computer mount; and
   a plastic bag holder.

6. A cart comprising:
   a first end frame, the first end frame including a first plurality of support members;
   a second end frame, the second end frame including a second plurality of support members;
   a middle frame, the middle frame having a third plurality of support members facing the first plurality of support members, and a fourth plurality of support members facing the second plurality of support members;
   a first receiving area configured to receive a plurality of containers disposed between the first end frame and the middle frame;
   a second receiving area configured to receive a second plurality of containers disposed between the middle frame and the second end frame; and
   a connector having a first end portion that is attached to the first end frame on a top surface of the first end frame so that the first end portion of the connector overlaps a portion of a top frame member of the first end frame, and a second end portion that is attached to the second end frame portion on a top surface of the second end frame so that the second end portion of the connector overlaps a portion of a top frame member of the second end frame, such that the connector spans diagonally across a length of the cart above the top surfaces of the first end frame and the second end frame, wherein a first nesting area is formed between the first frame portion and the third frame portion and a second nesting area is formed between the second frame portion and the third frame portion;

wherein, when the cart is in a nesting position with a neighboring cart, the connector abuts a connector of the neighboring cart and a first frame end frame of the neighboring cart resides within the first nesting area below a height of the connector.

7. The cart of claim 6, wherein the first plurality of containers and the second plurality of containers are removed in the nesting position.

8. The cart of claim 6, wherein an additional connector engages a bottom frame member of the first end frame and a bottom frame member of the second end frame.

9. The cart of claim 6, wherein the first plurality of containers and the second plurality of containers are slidably removable from both sides of the cart.

10. The cart of claim 6, wherein the first plurality of containers and the second plurality of containers are configured to receive store product from a salesfloor to fulfill an online order.

11. The cart of claim 6, further comprising:
a produce bag holder;
a meat bag holder;
a paper bag holder;
one or more bins;
a mobile computer mount; and
a plastic bag holder.

* * * * *